US008667417B1

(12) United States Patent
Goodger et al.

(10) Patent No.: US 8,667,417 B1
(45) Date of Patent: Mar. 4, 2014

(54) METHODS AND SYSTEMS FOR POP-UP SUPPRESSION (75) Inventors: Ben Goodger, Mountain View, CA (US); Glen Murphy, Palo Alto, CA (US); Brian Rakowski, Palo Alto, CA (US); Darin Fisher, San Carlos, CA (US)

(73) Assignee: Google Inc., Mountain View, CA (US)

( * ) Notice: Subject to any disclaimer, the term of this patent is extended or adjusted under 35 U.S.C. 154(b) by 323 days.

(21) Appl. No.: 12/202,381

(22) Filed: Sep. 1, 2008

(51) Int. Cl.
G06F 3/048 (2013.01)

(52) U.S. Cl.
USPC .......................................... 715/808; 715/809

(58) Field of Classification Search
USPC ................................................ 715/808, 809
See application file for complete search history.

(56) References Cited

U.S. PATENT DOCUMENTS

| 6,459,440 | B1 * | 10/2002 | Monnes et al. ............... 715/808 |
| 7,162,739 | B2 * | 1/2007 | Cowden et al. ................. 726/22 |
| 2003/0233482 | A1 * | 12/2003 | Skrepetos ..................... 709/250 |
| 2004/0001102 | A1 * | 1/2004 | Blaschke et al. .............. 345/789 |
| 2004/0125149 | A1 * | 7/2004 | Lapidous ....................... 345/808 |
| 2005/0055412 | A1 * | 3/2005 | Kaminsky et al. ............ 709/207 |
| 2005/0066290 | A1 * | 3/2005 | Chebolu et al. ............... 715/808 |
| 2006/0005148 | A1 * | 1/2006 | Cheng et al. ................... 715/808 |
| 2006/0069785 | A1 * | 3/2006 | Barrett .......................... 709/229 |
| 2006/0190831 | A1 * | 8/2006 | Kelso et al. ................... 715/764 |
| 2006/0224989 | A1 * | 10/2006 | Pettiross et al. .............. 715/779 |
| 2006/0265417 | A1 * | 11/2006 | Amato et al. ................. 707/102 |
| 2007/0294627 | A1 * | 12/2007 | Sauve et al. ................... 715/760 |
| 2007/0300178 | A1 * | 12/2007 | McArdle ....................... 715/781 |
| 2008/0046975 | A1 * | 2/2008 | Boss et al. ......................... 726/4 |
| 2008/0086733 | A1 * | 4/2008 | Jensen et al. ................. 718/102 |
| 2010/0185724 | A1 * | 7/2010 | Ishii .............................. 709/203 |

OTHER PUBLICATIONS

Beacham, "Those Annoying Pop-Under Ads (and How to Stop Them)", TVTechnology.com, Downloaded from http://www.tvtechnology.com/features/Net-soup/f-fb-popunderads2.shtml on Jul. 26, 2008, 3 pages.
"Actual Window Guard 4.5", WareSeeker.com!, Downloaded from http://wareseeker.com/Home-Shell-Desktop/actual-window-guard-4.5.zip/326082 on Oct. 31, 2008, Published on Jun. 27, 2007, 6 pages.

(Continued)

*Primary Examiner* — Enrique Iturralde
(74) *Attorney, Agent, or Firm* — Sterne, Kessler, Goldstein & Fox PLLC (57) ABSTRACT

Embodiments of the present invention include methods and systems for pop-up suppression. A method for pop-up suppression in a display of a web page to a user is provided. The method includes detecting a web page request for a pop-up. The method also includes automatically running the pop-up based on the web page request in a minimized pop-up window when the web page request for the pop-up is detected. A system for pop-up suppression is also provided. The system includes a pop-up manager configured to place a pop-up based on a web page request in a minimized pop-up window when the web page request for the pop-up is detected. The system also includes an execution module configured to run the pop-up in the minimized pop-up window. The system further includes a window module configured to open a minimized pop-up window for display when a user selects the minimized pop-up window.

16 Claims, 5 Drawing Sheets

(56) References Cited

OTHER PUBLICATIONS

Olsen, "Dodging Pop-Ups with Mozilla", ZDNet Australia, Downloaded from http://www.zdnet.com.au/news/business/soa/Dodging-pop-ups-with-Mozilla/0,139023166,120267426,00.htm on Oct. 27, 2007, published on Aug. 15, 2002, 3 pages.

"Grr! (Greyware Registry Rearguard)—Using Grr!", Greyware Automation Products, Inc., downloaded from http://www.greyware.com/software/grr/using.asp on Jul. 26, 2007, 6 pages.

"Grr! (Greyware Registry Rearguard)—Software Products", Greyware Automation Products, Inc., downloaded from http://www.greyware.com/software/ on Jul. 26, 2007, 4 pages.

* cited by examiner

METHODS AND SYSTEMS FOR POP-UP SUPPRESSION

BACKGROUND

1. Field of the Invention

Embodiments of the present invention relate to applications and the World Wide Web.

2. Background Art

Pop-ups have long been part of the web surfing experience. Pop-ups are separate windows that "pop up" while visiting a web page. Pop-ups may include advertisements, dialog boxes, software update notices, or other messages that seek a user's attention. Pop-ups may appear at anytime during or after a visit to a website. Some pop-ups are welcome while most others are not. Unwanted pop-ups may appear as multiple pop-up ads, banner ads, hover ads or pop-under ads. Pop-under ads appear only after a web browser page is closed as they pop-under the main browser window. Some pop-ups are generated by malware.

The most common way to handle pop-ups is to block them. Most popular web browsers include pop-up blocking tools. Third party software may also provide pop-up blockers. Pop-up blockers block most pop-ups generated by software such as JAVASCRIPT and ADOBE FLASH. However, some pop-ups still manage to appear. Pop-up ad creators have also made it more difficult to deal with pop-up ads once they do appear. For instance, a user may want to close a pop-up by clicking on the close window button in the pop-up window title bar. However, some pop-ups mislead the user by making the close window button unresponsive and by displaying a "Close" button that will not close the window but only lead to additional pop-ups.

Figure 1:
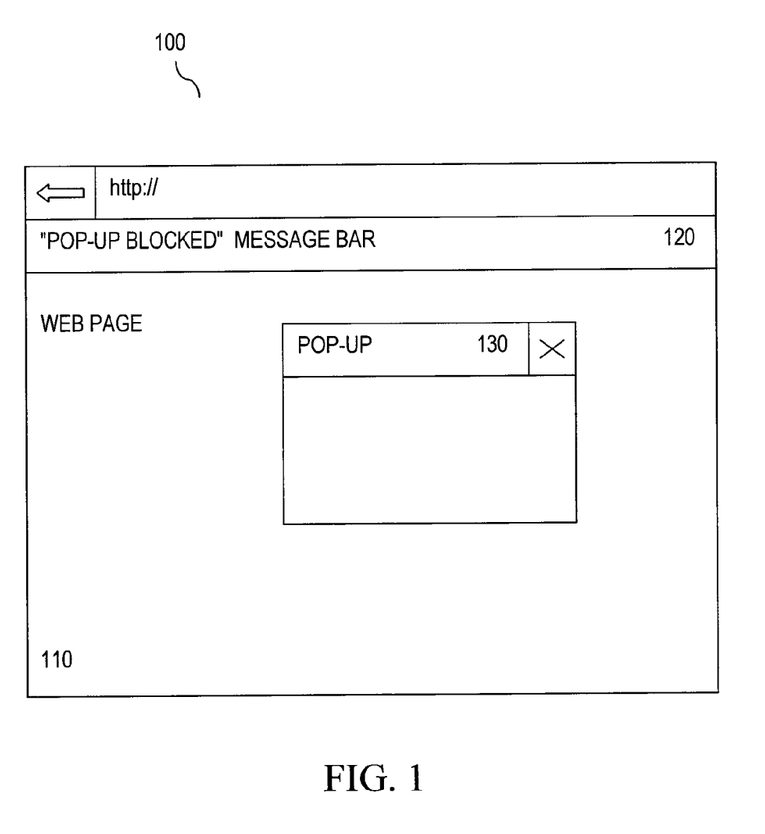
FIG. 1 is a diagram of a web browser window illustrating a current method of handling pop-ups.

Pop-up blockers have had mixed success in allowing legitimate or wanted pop-up windows. Pop-up blockers sometimes notify a user when a possibly legitimate pop-up window (part of a desired action or navigation) has been blocked. For example, these blockers may show a "pop-up blocked message" in message bar 120 on web page 110, as shown in the main browser window 100 of FIG. 1. A user may be asked to click on the message bar 120 or some other visual indicator in order to allow the blocked pop-up. The pop-up 130 would then be downloaded and then appear on the web page. Some of these pop-up blockers require multi-step configurations. Other pop-up blockers will simply block legitimate pop-ups.

What is needed are new methods and systems for handling pop-ups displayed to a user in a web page.

BRIEF SUMMARY

Embodiments described herein refer to systems and methods for pop-up suppression. A method for pop-up suppression in a display of a web page to a user is provided. The method includes detecting a web page request for a pop-up. The method further includes automatically running the pop-up based on the web page request in a minimized pop-up window when the web page request for the pop-up is detected.

A system for pop-up suppression is also provided. The system includes a pop-up manager configured to place a pop-up based on a web page request in a minimized pop-up window when the web page request for the pop-up is detected. The system also includes an execution module configured to run the pop-up in the minimized pop-up window. The system further includes a window module configured to open a minimized pop-up window for display when a user selects the minimized pop-up window.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Better methods for handling pop-ups are needed. Current pop-up blockers either allow some unwanted pop-ups or block legitimate pop-ups. Legitimate blocked pop-ups are not allowed to load and run. Aspects of the present invention allow pop-ups to run while in a minimized state. That is, pop-ups may be suppressed rather than blocked. Pop-up suppression provides many benefits. For example, a user will not have to wait for a pop-up to be downloaded upon allowing the pop-up. Also, the content of some pop-ups may be based on some state of the parent page that may be hard to create. For instance, a pop-up, such as a dialog box, may be generated based on the content of a parent web page or information entered into the parent web page. If this pop-up is allowed at a later time, that information may not be there and the dialog box will be useless or ineffective. A user may have to go back and recreate a navigation or entry. Many pop-up blockers may be configured to allow some legitimate pop-ups but such configuration and hostname entry is time-consuming and not always straightforward.

Figure 2:
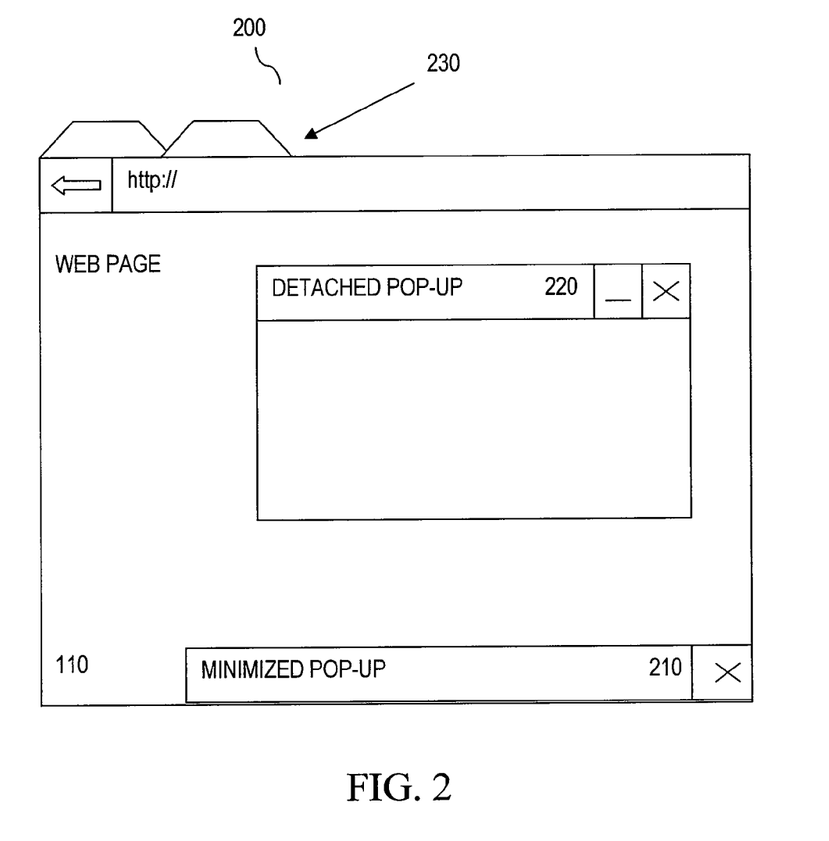
FIG. 2 is a diagram of a web browser window illustrating a method of pop-up suppression, according to an embodiment of the present invention.

Different types of pop-up windows may appear anywhere or anytime, making pop-ups difficult to manage. Aspects of the present invention provide for better handling of pop-ups. According to an embodiment, pop-ups may be automatically run in minimized pop-up windows and positioned as child web pages within a web page. This may include showing a minimized pop-up window title bar at the bottom of the parent web page, according to an embodiment. For example, FIG. 2 shows an exemplary main browser window view 200 of a web page 110. A minimized pop-up window 210 (or its title bar) may be positioned at the bottom right corner of the web page 110. The position may be on the parent web page 110 rather than in a separate pop-up window elsewhere on a user's screen. The minimized pop-up window title bar may also be absent from a user's taskbar. This will prevent pop-ups from cluttering the taskbar or system tray. The minimized pop-up window 210 appears larger in FIG. 2 than necessary for purposes of illustration. Detached pop-up window 220 will be discussed later.

Automatically running a pop-up in a minimized pop-up window has many advantages. For example, a user may be less worried about unexpected pop-ups appearing in different locations while navigating the web. A user may also be less worried about missing legitimate pop-up windows, which may be buried under other web page windows. According to aspects of the present invention, pop-ups may be expected at the same location.

This example is illustrative and not intended to necessarily limit the present invention. For instance, the minimized pop-up window 210 may be displayed to have a smaller or larger size relative to web page 110 and may also be located at different positions such as along a side of web page 110 if desired.

Figure 3:
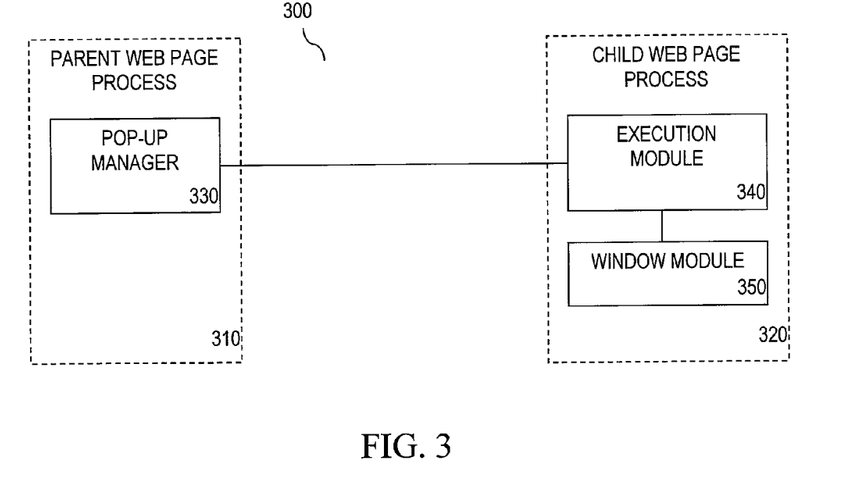
FIG. 3 is a diagram of a system for pop-up suppression, according to an embodiment of the present invention.

FIG. 3 illustrates an exemplary system 300 for pop-up suppression, according to an embodiment. System 300 includes a pop-up manager 330, an execution module 340 and a window module 350. Pop-up manager 330 may be coupled to execution module 340. Execution module 340 may be coupled to window module 350.

Pop-up manager 330 may be configured to detect a pop-up, according to an embodiment. This detection of a pop-up can be any type of pop-up detection including a pop-up launched in response to a web page request for a pop-up, a user request, or other pop-up initiation. For instance, pop-up manager 330 may be configured to detect a web page request for a pop-up. According to a further embodiment, pop-up manager 330 may be configured to determine if a web page request originated in response to a user gesture. A user gesture may include a user URL selection, a user clicking on a portion of the web page, a user entering information, or any other action or navigation by a user that could result in a request for a web page. Pop-up manager 330 may also be configured to determine if a web page request was originated in response to an automatic generation by a web page. Typically pop-ups are web page requests made by a web page. In this embodiment, a web request for a pop-up may be detected if it is determined that a web page request was made by a web page. The web page may be the web page that a user is currently visiting. The web page making the request may be another web page or a past visited web page. The web page request may be originated by a web page automatically. According to another embodiment, a web page request may be initiated by a web page in response to a user gesture.

Pop-up manager 330 may be configured to place a pop-up in a minimized window, according to an embodiment. This pop-up may be based on a web page request. The pop-up may be placed in a minimized pop-up window when a web page request for the pop-up is detected. According to an embodiment, a pop-up window way be generated and then automatically minimized. The pop-up window may also be generated as a minimized window. The pop-up may then run in the minimized pop-up window. According to another embodiment, the pop-up window may run in a window, which is then immediately and automatically minimized. Execution module 340 may be configured to manage running a pop-up in the minimized window. Window module 350 may be configured to handle opening the minimized pop-up window for display upon such a request by a user.

According to one feature, multiple threads may be used to carry out rendering in parent and child web pages in a browser. Pop-up manager 330, execution module 340 and window module 350 may be configured to operate in a multi-threading environment, according to an embodiment. For instance, pop-up manager 330 may be executed by parent web page process 310. Parent web page process 310 represents a process or thread that is, or is handled by, a renderer of a parent web page. A parent web page may include the web page that a user is visiting. The parent web page may be the web page that requests a pop-up. Execution module 340 and window module 350 may also be executed by parent web page process 310.

Execution module 340 and window module 350 may be executed by child web page process 320, according to an embodiment. A child web page process 320 may be a process or thread that renders the pop-up in the minimized pop-up window. Because a child web page process 320 is spawned from a parent web page process 310, parent web page process 310 may place the minimized pop-up window within the parent web page. According to an embodiment, the minimized pop-up window title bar may be placed at the bottom right hand corner of the parent web page. The minimized pop-up window may also be placed anywhere within the parent web page. According to an aspect of the invention, the child web page window will not be able to operate or appear anywhere outside of the parent web page or a tab container which is displaying the parent web page.

Parent web page process 310 may determine how to display web page 110 with minimized pop-up window 210, according to an embodiment. According to another embodiment, parent web page process 310 may coordinate with child web page process 320 to display minimized pop-up window 210 (or its title bar) on web page 110. This coordination may also include parent web page process 310 providing display instructions to child web page process 320. According to a further embodiment, pop-up manager 330 may coordinate with execution module 340 to display minimized pop-up window 210 on web page 110.

When a minimized web page appears at the bottom of a parent web page, it may be considered by an operating system as being part of the parent web page. As a result, a title bar for the minimized pop-up window 210 may be visible to a user in the web page but a taskbar button for the web page will not be visible in the taskbar or system tray. A taskbar of an operating system is a bar which holds icons, buttons, or visual indicators of which user applications are open on a user's system. A taskbar is typically found at the bottom of a user's screen but in some cases may also be located elsewhere, such as at the top of a screen or on the side. For example, application taskbar buttons visible in a taskbar may include a web browser taskbar button, an email application taskbar button, or a taskbar button for any other applications which may be opened on a user's computer. Such a taskbar or system tray may be expressed in other forms. A taskbar may not exist for some computing devices, mobile devices or operating systems. Nevertheless, if a task bar is shown, it may usually contain a taskbar button or representation of a browser or parent web pages. According to an embodiment, a pop-up window may be represented in a taskbar or system tray only after being selected by a user to be opened. In this case, a taskbar button may now appear for a pop-up window in a taskbar because the pop-up window becomes detached from its parent web page.

Execution module 340 may be configured to handle multiple pop-ups, according to an embodiment. Multiple minimized pop-up window title bars may be stacked upon each other when a number of minimized pop-up windows are created. This number may be predetermined. This number may also be any number greater than one. According to a further embodiment, minimized pop-up windows may be stacked as to appear as one minimized pop-up window or one minimized pop-up window title bar. According to another embodiment, stacked pop-up window title bars may overlap each other enough to leave visible slivers of successive window title bars. Because parent web page process 310 may be a renderer which controls the display of web page 110, minimized pop-up windows or title bars may be displayed as stacked in any manner instructed by the parent web page renderer.

In another embodiment, stacked minimized pop-up window title bars may be annotated. Stacked minimized pop-up windows may also be numbered or lettered. Such annotation or labeling may assist a user who in selecting which pop-ups to open and which minimized pop-ups to delete without opening.

According to an embodiment, execution module 340 may be configured to run a pop-up in a minimized pop-up window. In this embodiment, all pop-ups will be run in its respective minimized pop-up window. Running a pop-up includes downloading software code and executing the code. Execution module 340 may manage pop-up downloading. Execution module 340 may also manage pop-up execution. According to another embodiment, some pop-ups that are verified as being destructive, dangerous or completely useless may be blocked or handled differently. According to an embodiment, some pop-up ads that are part of the web page rather than a web page request, such as hover ads, may be run in a minimized pop-up window. However, these ads may be detected in a different manner. These ads may also be allowed to appear as they are part of the web page. In most cases, a user may be able to avoid hover ad pop-ups by not hovering over the ad or allowing the ad to retire by itself.

According to an embodiment, execution module 340 may be configured to play audio while running the pop-up in the minimized pop-up window. For example, a web page may request a pop-up which plays satellite radio. Though the window is minimized, the audio may still be heard because the pop-up will run in the minimized pop-up window. According to another embodiment, execution module 340 may be configured to run a web-based script, such as JAVASCRIPT or ADOBE FLASH, in the minimized pop-up window.

Window module 350 may be configured to open a minimized pop-up window for display when a user selects the minimized pop-up window, according to an embodiment. The pop-up display window may display the pop-up as it would have looked had it not been suppressed. According to another embodiment, the pop-up may be displayed in a size or configuration directed by window module 350. A minimized pop-up window may be opened by a user clicking on the minimized pop-up window title bar. A user may also open the pop-up window in any other manner indicating a request to open a minimized pop-up window. In some cases, a user may choose to delete a pop-up while it is in its minimized state.

A user may be notified of a pop-up in additional ways, according to an embodiment. For example, an icon or a message may appear in a uniform resource locator (URL) bar. An icon or a message may also appear in a status bar of a browser. According to another embodiment, pop-ups or pop-up indicators may dock to the browser tab strip 230. Minimized pop-ups may also be indicated by mini-tabs docked to tab strip 230. In another embodiment, an icon or message may appear elsewhere on a user's screen, such as in a specified portion of a system tray. This notification is distinct from an application taskbar button on the taskbar, as described above.

Window module 350 may be configured to detach a pop-up window 220 from the parent web page 110 and render the pop-up window 220 as a new parent page, according to an embodiment. Pop-up manager 330 may spawn a new parent web page for the pop-up. Window module 350 may request pop-up manager 330 to spawn a new web page. Window module 350 may request that the browser spawn a new web page. Pop-up content may then be removed from the suppressed content and placed in the new web page. The minimized pop-up window may then be closed. In some cases, this new web page for a pop-up may be a limited version of a web page. In another embodiment, detached pop-up window 220 may be represented by a tab or a mini-tab docked onto tab strip 230.

Figure 4:
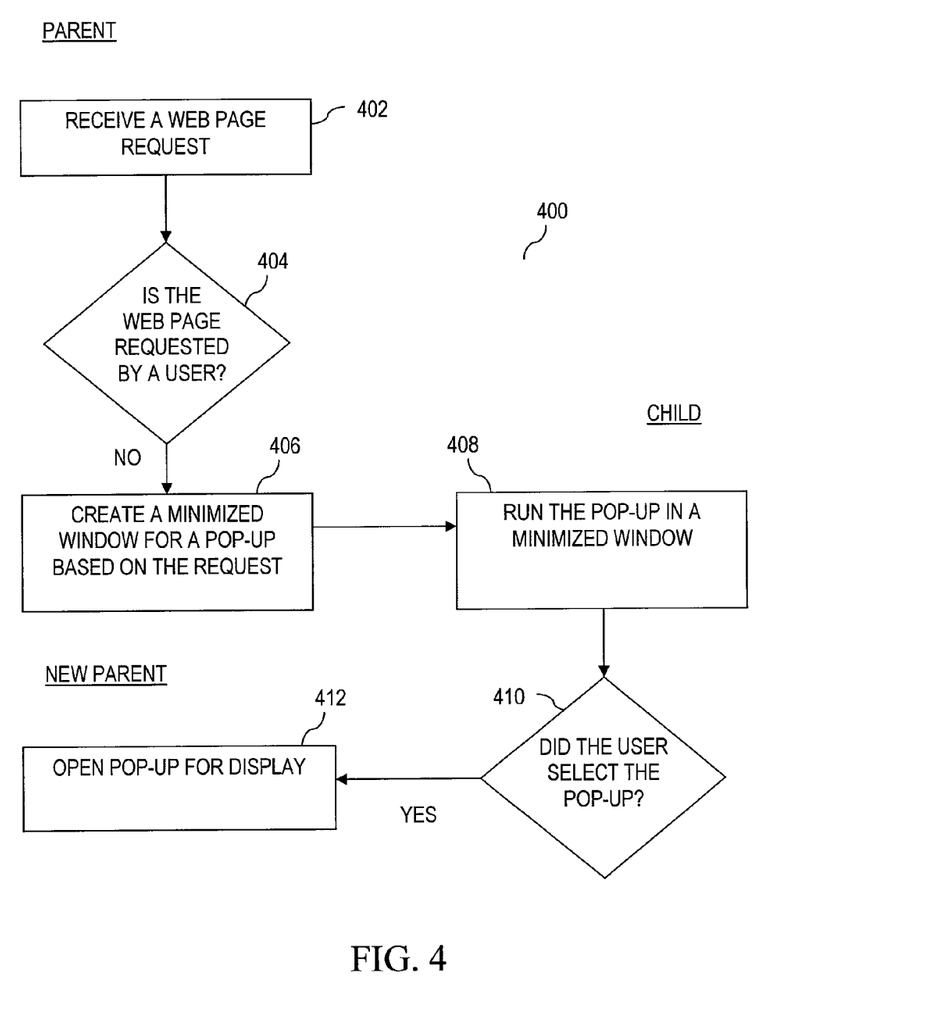
FIG. 4 is a flowchart illustrating a method for pop-up suppression, according to an embodiment of the present invention.

FIG. 4 illustrates an exemplary method 400 for pop-up suppression, according to an embodiment. In step 402, a web page request is received. This request may be received by the browser. The web page request may be detected by pop-up manager 330. In step 404, it is determined if a web page is requested by a user. If a request is not made by a user or a user gesture, it may be determined that a web page request was initiated by a web page. Pop-manager 330 may also directly determine that a web page request originated from a web page. A request for a web page by a web page may indicate a pop-up will appear. If a pop-up is detected, in step 406, a minimized window may be created for a pop-up that is based on the web page request. The pop-up window is minimized automatically.

In step 408, the pop-up may be run in the minimized pop-up window. The pop-up may be downloaded and executed. The pop-up content may not be visible when the pop-up window is minimized. However, audio may still be heard. In some cases, audio may also be disabled by the user. In other cases, audio may be pre-selected to be disabled.

In step 408, the minimized pop-up window may be rendered as a child web page of the parent web page. This allows the minimized pop-up window to appear in the parent web page itself. The minimized pop-up window may be located in any position, such as the bottom right hand corner of the parent web page. This location is in contrast to appearing as a separate window outside the confines of the parent web page or in a taskbar on the user's desktop. According to an embodiment, the pop-up may be run with the assistance of execution module 340. The user may benefit from a pop-up running in a minimized pop-up window in a predictable location within the parent web page.

In step 410, window module 350 determines if a user has selected the pop-up for display. A user may select the pop-up by clicking on the minimized pop-up window title bar. A user may also select the pop-up or on any portion of a representation of the pop-up in order to display the pop-up. If window module 350 determines that a user selected the pop-up for display, method 400 may proceed to step 412. In some cases, a user may choose to delete the pop-up without opening or viewing the pop-up. The user may click on a "close" or "delete" icon or perform any other step manifesting an intent to delete the pop-up. In some cases, a user may select to open or view a minimized pop-up at another time. In other cases, a user may select to move the pop-up to another location. According to an embodiment, a user may begin dragging the minimized pop-up window and it will transform into a regular pop-up window. It may continue to be dragged by the user's mouse movements.

In step 412, the pop-up may be displayed in another window within the parent web page. According to an embodiment, a pop-up may be displayed in a window separate from the parent web page window. A pop-up may also be rendered as a new parent web page. This new pop-up web page may be represented as such using a visual indicator. Such a visual indicator may be a browser tab in tab strip 230. A visual indicator may also include a window taskbar button in the taskbar. Steps 410 and 412 may be performed by window module 350. Steps 410 and 412 may also be performed or assisted by pop-up manager 330. Aspects of the present invention provide for pop-up suppression for better handling of pop-ups.

Aspects of the present invention, for exemplary system 200, system 300 and/or method 400 or any part(s) or function(s) thereof may be implemented using hardware, software modules, firmware, tangible computer readable media having instructions stored thereon, or a combination thereof and may be implemented in one or more computer systems or other processing systems.

Figure 5:
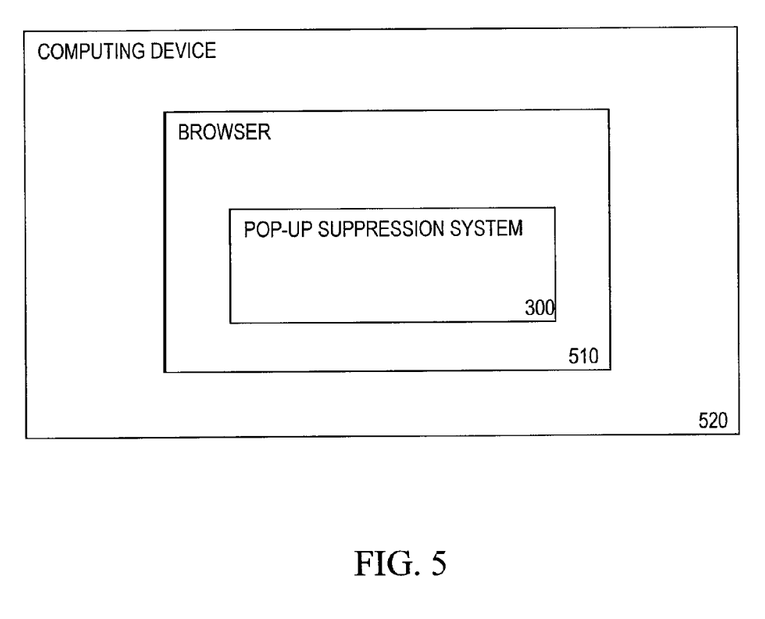
FIG. 5 is a diagram of a system for pop-up suppression in a computing system, according to an embodiment.

Pop-up suppression system 300 may operate in browser 510 as shown in FIG. 5. Browser 510 may include any conventional browser including but not limited to, for example, FIREFOX available from Mozilla Foundation Inc., INTERNET EXPLORER available from Microsoft Corp., SAFARI available from Apple Computer, Inc., and OPERA available from Opera Software ASA. Browser 510 may also be a multi-process browser as described in "Multi-Process Browser Architecture," by Fisher et al., U.S. Provisional Appl. No. 61/052,719, filed May 13, 2008.

Browser 510 may exist within or be executed by hardware in a computing device. For example, browser 510 may be software, firmware, or hardware or any combination thereof in a computing device. A computing device can be any type of computing device having one or more processors. For example, a computing device can be a workstation, mobile device (e.g., a mobile phone, personal digital assistant, or laptop), computer, game console, set-top box, kiosk, embedded system or other device having at least one processor and memory.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for pop-up suppression in a display of a web page to a user comprising:
    detecting a request for a web page by a first process of a multi-process web browser;
    determining whether the request for the web page originated in response to a user gesture;
    automatically running a pop-up based on the request for the web page in a minimized pop-up window by a second process of the multi-process web browser when the request for the web page is determined to be in response to an automatic generation by a web page and not originated in response to the user gesture; and
    stacking a plurality of minimized pop-up windows within the web page when a number of the plurality of minimized pop-up windows in the web page exceeds a predetermined number.

2. The method of claim 1, further comprising positioning the minimized pop-up window as a child web page within the web page.

3. The method of claim 1, further comprising opening the minimized pop-up window for display when a user selects the minimized pop-up window.

4. The method of claim 3, wherein the opening includes displaying the pop-up window in a window that displays a new web page.

5. The method of claim 1, wherein the running a pop-up in a minimized pop-up window further comprises playing audio.

6. The method of claim 1, wherein the running a pop-up in a minimized pop-up window further comprises running a web-based script.

7. The method of claim 1, further comprising displaying a visual indicator for user notification in the minimized pop-up window.

8. The method of claim 1, wherein a pop-up may include at least one of an advertisement, a dialog box, or an alert.

9. The method of claim 1, further comprising displaying the minimized pop-up window such that it is visible to the user.

10. The method of claim 1, wherein the minimized pop-up window does not appear in a taskbar or system tray on a desktop view of a user's screen.

11. A system for pop-up suppression comprising:
    a computing device comprising a processor and a memory;
    a pop-up manager, implemented on the computing device, configured to:
        determine whether a request for a web page originated in response to a user gesture,
        place a pop-up based on the request for the web page in a minimized pop-up window when the request for the web page is detected by a first process of a multi-process web browser, and determined to be originated in response to an automatic generation by a web page and not originated in response to the user gesture; and
        stack a plurality of minimized pop-up windows within the web page when a number of the plurality of minimized pop-up windows in the web page exceeds a predetermined number;
    an execution module configured to run the pop-up in the minimized pop-up window by a second process of the multi-process web browser; and
    a window module configured to open a minimized pop-up window for display when a user selects the minimized pop-up window.

12. The system of claim 11, wherein the pop-up manager is further configured to position the minimized pop-up window as a child web page within the web page.

13. The system of claim 11, wherein the window manager is further configured to open the minimized pop-up window for display when a user selects the minimized pop-up window.

14. The system of claim 11, wherein the execution module is further configured to play audio while running the pop-up in the minimized pop-up window.

15. The system of claim 11, wherein the execution module is further configured to run a web-based script while running the pop-up in the minimized pop-up window.

16. The system of claim 11, wherein the minimized pop-up window is visible to the user.

\* \* \* \* \*